United States Patent Office 3,230,276
Patented Jan. 18, 1966

3,230,276
STYRENE-PROPYLENE GROSS COPOLYMERS, A METHOD THEREFOR AND PRODUCTS MADE THEREFROM
Louis H. Peters, Somerville, Dale F. Pollart, New Brunswick, and Alford G. Farnham, Mendham, N.J., assignors to Union Carbide Corporation, a corporation of New York
No Drawing. Filed Oct. 28, 1959, Ser. No. 849,143
6 Claims. (Cl. 260—878)

This invention relates to styrene-propylene copolymers, a method for producing the same, and products made therefrom. More particularly, the invention relates to gross copolymers of styrene and propylene containing a substantial amount of isotactic and crystalline styrene-propylene copolymer and a method for producing such gross copolymers. The invention also relates to styrene-propylene copolymer films having pronounced shrinkage characteristics at low temperatures and further to styrene-propylene copolymer films useful for wrapping perishable food products.

By the term "gross copolymer" in the present specification and claims is meant the total product of the copolymerization reaction of styrene and propylene in the proportions, under the conditions, and in the presence of the catalyst hereinafter set forth.

Prior to our discovery, therew as not known a copolymer of styrene and propylene sufficiently isotactic and crystalline to provide desirable rigidity and strength at elevated temperatures. Nor was there known a method for producing styrene-propylene copolymers possessing a degree of crystallinity and isotacticity sufficient to provide adequate rigidity and strength.

It has been known heretofore to copolymerize monovinyl aryls and ethylenically unsaturated alkenes in the presence of a "coordination catalyst," i.e. catalyst formed by the reaction of a polyvalent metal compound and a reducing agent. The products obtained from such copolymerizations are generally high molecular weight, linear copolymers. Heretofore, it has been assumed, or at least inferentially stated, that all monomers falling within the generic classes of monovinyl aryl and ethylenically unsaturated alkenes react similarly in the presence of the above generically defined coordination catalyst to produce structurally similar copolymers.

Attempts to adapt methods heretofore suggested, however, to production of copolymers of styrene and propylene have resulted in poor yields of virtually completely amorphous (i.e. 90% or more amorphous) non-isotactic styrene-propylene copolymers. The properties of amorphous styrene-propylene copolymers are not desirable. Poor rigidity and strength at temperatures above about 100° C. severely restrict the ambit of usefulness of the amorphous copolymers. For example, film formed from amorphous styrene-propylene copolymer lacks toughness and strength. The unsatisfactory performance characteristics of heretofore known styrene-propylene copolymers is a direct result of their being amorphous to the extent of at least 90%.

With hitherto known polymerization methods, the copolymeric products obtained are high in molecular weight and linear, but substantially non-crystalline and non-isotactic in molecular orientation. Linearity is synonymous with crystallinity in some polymers, e.g., ethylene polymers; however, with styrene-propylene copolymers, linearity is not synonymous with crystallinity. In styrene-propylene copolymers, the copolymer must be "isotactic" in molecular configuration as well, if strength and toughness are to be retained at temperatures over 100° C. This fundamental difference between propylene and alkenes such as ethylene is not recognized by those in the art teaching the use of the same techniques for copolymerization with styrene of either propylene or ethylene interchangeably. With ethylene, useful copolymers both linear and crystalline are obtained; with propylene, linear but amorphous, non-isotactic and non-crystalline copolymers are the result. The absence of a substantial degree of crystallinity leaves such copolymers deficient in important properties as explained above and unable to compete with established materials in many areas.

A potentially large market for synthetic polymeric materials is as wrapping film for a wide variety of articles. An increasing number of goods, particularly perishable food products, are packaged by the producer in the containers in which they are ultimately sold in retail outlets. Suitable containers for this purpose must be tough and durable enough to withstand possible rough handling in transit. Also, it is desirable for the containers to be attractive; high surface gloss and wrapper transparency have been found to stimulate retail sales of packaged goods.

A number of packaging materials are known today which meet ordinary requirements of toughness and attractiveness when not too thick. The thicker films are desirable from a handling standpoint, but are undesirable because of unattractive haze and cloudiness in the greater thicknesses. Another synthetic polymeric material, polystyrene, provides wrapping films of adequate strength with good gloss and clarity and in thicknesses useful for packaging. Such film is not suited, however, to certain specialized areas of packaging because of a lack of shrinkability.

Shrinkable films are those which will contract in machine direction (MD) and/or transverse direction (TD) upon suitable treatment. Heat-shrinkable films, as the name implies, are those which will contract in machine direction and/or transverse direction upon exposure to an elevated temperature environment. The term "heat-shrinkable" as used throughout the present specification and claims refers to an appreciable degree of shrinkage, above about 15%, in both machine direction and transverse direction at temperatures of 100° C. or less. Although many synthetic polymeric films after biaxial stretching, i.e., stretching or elongation in the machine direction axis and in the transverse direction axis, will contract upon exposure to an elevated temperature environment, few do so to an extent sufficient to be characterized "heat-shrinkable" within this definition of the term. A minimum shrinkage of 15% in both directions is essential in certain packaging applications. Preferably, this degree of shrinkage is achieved at temperatures below 100° C. The property of heat-shrinkability is particularly important in the packaging of fresh meats, especially poultry, which are to be subsequently quick-frozen and shipped. Non-heat-shrinkable films are adequate wrapping material only where the wrapped article has relatively flat surfaces and fairly regular contours. Poultry, of course, presents an oddly shaped, irregularly varying contour which is difficult in the extreme to package attractively. Conventional film presents a wrinkled, untidy and generally unattractive appearance. Vacuum drawing of the film over the poultry does not eliminate the wrinkles and the untidiness of the wrapping. Also, the presence of air space between the poultry and the wrapping causes "freezer burn" which toughens the skin of the poultry. The only means yet devised to attractively and air-tightly wrap poultry has been to heat-shrink the film after vacuum drawing. Other desirable characteristics of the heat-shrinkable film used to wrap poultry and similar retailed articles is surface glossiness to stimulate sales.

A critical property of heat-shrinkable films used for wrapping frozen goods is abrasion resistance and cracking resistance at low temperatures, especially below 0° C. Presently widely used heat-shrinkable films have a tendency to crack, particularly where they rub against leg bones, and, in vinyl films particularly, the cracks propagate rapidly and the package is destroyed.

Well-known synthetic polymeric materials such as polypropylene and polystyrene, while offering good toughness, clarity and attractiveness, are not heat-shrinkable. Propylene homopolymer film biaxially oriented at 125°–135° C. and then immersed in 90° C. water, exhibits a negligible shrinkage of 2% in the machine direction and 3% in the transverse direction; in boiling water (100° C.) shrinkage is better, but only 4% in machine direction and 8% in the transverse direction. Nor is polystyrene heat-shrinkable. In amorphous froms, biaxially oriented polystyrene shrinks 1% at 90° C. and 8% at 100° C. Crystalline polystyrene is dimensionally stable at 90–100° C.

Heretofore, then, the advantageous properties of synthetic polymeric films, particularly polypropylene and polystyrene, have not been available to users of heat-shrinkable film. Heretofore known styrene-propylene copolymers have been 90% or more amorphous and hence not suited in terms of strength for packaging material. For example, an 18% by weight copolymerized styrene-82% copolymerized propylene copolymer prepared from a catalyst mixture consisting of titanium tetrachloride ($TiCl_4$) and an excess of triisobutyl aluminum was found to be over 90% soluble in boiling toluene. Oriented strips of this material lost their strength and became soft and tacky when immersed in boiling water.

It is an object of our invention, therefore, to provide crystalline and isotactic gross styrene-propylene copolymers which are superior in physical properties to the substantially amorphous styrene-propylene copolymers heretofore known.

It is another object to provide a method for producing styrene-propylene copolymers which yields polymers characterized by a higher crystalline content than styrene-propylene copolymers otherwise produced.

It is another object to provide heat-shrinkable film possessing outstanding properties of toughness and attractiveness.

It is another object to provide heat-shrinkable film exhibiting both the toughness and attractiveness of propylene and styrene homopolymer films.

It is a further object to provide a synthetic polymeric film characterized by outstanding shrinkage properties and exhibiting high surface gloss, good toughness, excellent tear resistance, low haze and superior low temperature strength.

We have now found that these and other objects are achieved in accordance with the present invention by subjecting propylene and styrene to polymerization conditions of temperature and pressure in the presence of a catalyst consisting of crystalline titanium trichloride and an alkyl aluminum compound. As a result of this copolymerization, there is obtained a gross copolymer comprising copolymerized styrene and propylene. The gross copolymer is a mixture of styrene-propylene copolymers of varying solubility characteristics. At least 40% by weight of the gross copolymer is crystalline isotactic material insoluble in heptane, cyclohexane, chloroform and toluene. The remainder of the gross copolymer comprises one or more fractions, each soluble in toluene. Some fractions are in addition soluble in one or more of the following: heptane, cyclohexane and chloroform.

We have also found that a biaxially oriented film comprising styrene-propylene gross copolymer containing at least 10% by weight copolymerized styrene and up to 90% by weight copolymerized propylene possesses outstanding shrinkage characteristics. Biaxially oriented styrene-propylene copolymer film of this invention shrinks from 20 to 40 percent upon immersion in 90–100° C. water for 5–10 seconds. These outstanding shrinkage characteristics are quite surprising in view of the negligible shrinkage obtained with homopolymers of the copolymer components at these temperatures. The biaxially oriented copolymer films of this invention, because of their orientability at low temperatures (ca. 70–100°) offer processing advantages over polypropylene and polystyrene films which cannot be appreciably heat shrunk, at temperatures below 100° C. respectively. Possible lower film temperature during orientation reduces residence time in the orientation equipment and increases production rates.

A catalyst consisting of crystalline titanium trichloride and a trialkyl aluminum compound containing up to four carbon atoms in each alkyl group, such as triisobutyl aluminum, is the sole useful catalyst in our invention. The styrene-propylene copolymers obtained in this invention are not obtainable with other than a crystalline titanium trichloride ($TiCl_3$) containing catalyst. Hence our invention is limited to $TiCl_3$ in crystalline (purple) form as the metal halide of the catalyst. Contrary to other teachings in the art, various coordination catalysts can and do give significantly different results in copolymerizations of a styrene with propylene on the one hand, and with ethylene on the other. For example, from prior art teachings it would be thought that a suitable catalyst for the copolymerization of styrene and propylene would be a titanium tetrachloride ($TiCl_4$)-containing catalyst composition. It was found, however, that the styrene-propylene copolymer obtained therewith was non-isotactic and non-crystalline and over 90% soluble in boiling toluene, indicating a content of over 90% amorphousness in the copolymer. Materials made with this copolymer, such as oriented films, lack toughness and strength, and fail to pass satisfactorily even moderately severe tests. They are not suited to use in wrapping applications such as poultry packaging.

With the crystalline titanium trichloride ($TiCl_3$)-trialkyl aluminum catalyst of this invention, however, the styrene-propylene copolymer obtained is at least 40% crystalline, i.e., contains a minimum of 40% by weight styrene-proplene copolymer insoluble in boiling toluene. And materials made from the copolymer show excellent resistance to wide varieties of stresses.

We employ the crystalline titanium trichloride and the alkyl aluminum compound in substantially equimolar amounts in the catalyst, i.e., 0.5:1 to 1:0.5 of titanium trichloride to trialkyl aluminum compound. Other, slightly broader ratios also provide satisfactory catalyst action, but usually result in generally poorer yields of copolymer. We prefer to use crystalline titanium trichloride in an equimolar mixture with triisobutyl aluminum as the catalyst in the method of the present invention.

A particularly desirable embodiment of our method is as follows: The catalyst is employed in concentration ranging generally from 5 to 60 and preferably from about 10 to 20 millimoles of catalyst per liter of a solution comprising styrene dissolved in a suitable inert organic solvent, i.e., one which is inert to the catalyst and a solvent for the styrene monomer such as toluene, heptane and cyclohexane. The amount of styrene in the solvent can range from 5 up to 50 and is preferably from 5 to 20 volume percent.

The styrene/solvent solution containing the added catalyst is placed in a suitable vessel equipped with agitating means such as an impeller. Propylene addition is begun while the agitated catalyst-styrene-solvent mixture is at room temperature (25° C.). Polymerization begins immediately but to increase the polymerization reaction rate, the temperature is gradually raised to a temperature up to about 100° C. and preferably from 60 to 80° C., depending upon the solvent employed. Agitation and propylene addition are continued with the propylene being introduced into the reaction vessel below the surface of the vessel contents at a slight positive pressure, usually about 2 to 5 lbs./sq. in. The reaction can be run at higher pressures, e.g., 2 atmospheres, but this is not particularly advantageous as far as yield and/or rate is concerned and necessitates additional equipment. Propylene addition is continued until the buildup of polymer makes agitation difficult. With the above-described reaction scheme, we have found the rate of copolymerization to be about 2 to 6 grams of styrene-propylene copolymer per gram of catalyst per hour. Modification of the catalyst, as by reducing the particle size of the crystalline titanium trichloride can be used to increase the above rates of copolymerization.

Small laboratory scale batches generally require from 3 to 6 hours to achieve substantially complete reaction. Larger batches, pilot plant scale, require from 10 to 25 hours. In the batch type reactions described, the catalyst productivity is on the order of 20 to 40 grams of styrene-propylene copolymer per gram of catalyst. Conversion of propylene is generally about 80% and styrene conversion generally about 10–30%.

In order to stop the reaction, an agent such as isopropanol or butanol is added in an amount approximately equal to the volume of the reaction mixture. Excess styrene, propllene and solvent are then removed from the reaction mass, suitably by azeotropic distillation with isopropanol or butanol. The slurry of copolymer remaining in the vessel is filtered off in a centrifugal filtering apparatus and the copolymer is then washed with additional isopropanol or butanol and dried under reduced pressure at temperatures around 70° C. for about 12 hours.

The product from the above-described reaction is a gross copolymer of styrene and propylene containing up to about 50% copolymerized styrene. The copolymer has a 1P melt index of from 0.2 to about 3.0 (ASTM D–1238–57T) and a Rossi-Peakes flow of 60 to 120 seconds at 160° C. and 1000 lbs./sq. in. The copolymer is suitable for fabrication in commercial injection molding and extrusion equipment.

The gross copolymers of this invention contain a minimum of 5% and up to about 50% by weight copolymerized styrene. Copolymers containing from 8–32% by weight copolymerized styrene are preferred for injection molding, pipe extrusion, wire coating extrusion and sheeting. Copolymers containing from 10% to 35% by weight copolymerized styrene are preferred for biaxially oriented, heat-shrinkable film applications.

The critical feature of the copolymers of this invention, which distinguishes the styrene-propylene copolymers obtained as described herein from those known heretofore, is a minimum of 40% by weight crystalline copolymer in the gross-copolymer. Styrene-propylene copolymers having this highly desirable degree of crystallinity have not been known heretofore, because the criticality of the use of a crystalline $TiCl_3$ containing catalyst was not appreciated prior to this invention.

To determine the weight percent of the crystalline copolymer fraction in the gross copolymer and the solubility characteristics of the other fractions thereof, a series series of solubility tests are performed. In general, the procedure is as follows:

A 5.00 gram sample is placed in a thimble filter suspended below a reflux condenser fitted into a 250 ml. flask containing 100 ml. of the solvent. Upon heating the flask, the vapors of the boiling solvent pass around the thimble filter, are condensed in the condenser tube and drop back into the flask through the sample held in the thimble filter. Polymer extracted by the solvent collects in the flask. As fresh solvent vaporizes, the cycle is repeated. The solvents used for successive extractions are heptane, cyclohexane, chloroform and toluene in that order. After each extraction the portion of the sample remaining in the thimble filter is extracted with the next solvent.

All the gross copolymers of this invention contain at least three fractions. The preferred gross copolymers of this invention contain four fractions. The first fraction comprises a minimum of 40% of the gross copolymer and is insoluble in heptane, cyclohexane, chloroform and toluene. This fraction of the copolymer contains 5 to 10% by weight copolymerized styrene, is isotactic, and imparts substantially the strength and rigidity at elevated temperatures characteristic of the copolymers produced in the present invention.

A second fraction of the gross copolymer is soluble in heptane, cyclohexane, chloroform and toluene. This fraction contains between 20 and 45% by weight copolymerized styrene, has a reduced viscosity in toluene determined as a 0.2% by weight solution of 2.0 to 2.5.

A third fraction of the gross copolymer is soluble in cyclohexane, chloroform and toluene and insoluble in heptane. This fraction contains between 50 and 70% by weight copolymerized styrene and has a reduced viscosity in toluene determined as a 0.2% by weight solution of 3.0 to 3.5.

The fourth fraction of the gross copolymer, if any, is soluble in chloroform and toluene and insoluble in heptane and cyclohexane. This fraction contains from 60 to 80% by weight copolymerized styrene and has a reduced viscosity in toluene determined as a 0.2% by weight solution of 3.5 to 4.0.

At least three of the above fractions are found in all of the copolymers of the present invention irrespective of the percent of copolymerized styrene present in the gross copolymer. The obtaining of a fractionable gross copolymer with the above characteristics is one of the distinguishing features of the styrene-propylene copolymers of this invention and is peculiar to the use in our method of the above defined crystalline titanium trichloride-alkyl aluminum catalyst.

The weight percent of any given fraction varies with the total amount of styrene present in the gross copolymer. In particular, the amount of isotactic, toluene insoluble styrene-propylene copolymer decreases with increased weight percent of styrene in the gross copolymer. As a result, in most mechanical properties, the gross copolymers containing minimal amounts of styrene are superior to gross copolymers containing near maximum amounts. This is true of impact strength, hardness and to a lesser extent of percent elongation.

The gross styrene-propylene copolymers of this invention contain from 5–50% by weight copolymerized styrene and are in the molecular weight range of commercial molding material and generally have melt indexes between 0.1 and 1.0. The copolymeric materials are flexible, tough semi-rigid thermoplastics, have a final M.P. of about 160° C. and use-temperatures as high as 120–130° C. They can be molded into smooth, glossy hard-surfaced articles characterized by desirable elongation, impact and stress cracking properties, or extruded into sheets or wire coating, translucent or opaque, exhibiting great toughness, abrasion and tear resistance, and excellent electrical properties.

The films made from the above- described copolymers containing 10% to 35% copolymerized styrene can be drawn several hundred percent in either direction to give thin, exceptionally tough, completely transparent film. As outlined above, these films are heat-shrinkable to an outstanding degree. Although films can be prepared from styrene-propylene copolymer containing over 35% by weight copolymerized styrene, we have found such films to lack the toughness characteristic of the lower copolymerized styrene content copolymers and also to be deficient in clarity and hence to be of lower attractiveness. Below the lower limit of 10% by weight copolymerized styrene, the copolymer films are reduced in heat-shrinkability to such an extent as to be excluded under the above definition of the term. The preferred copolymers are 40% to 65% insoluble in toluene and thus have a 40% to 65% crystalline copolymer content by weight and conversely a 35% to 60% by weight toluene-extractable, amorphous copolymer content.

We particularly prefer for highest gloss, clarity and strength, as well as maximum heat-shrinkability, biaxially oriented styrene-propylene copolymer film having a 10% to 20% by weight styrene content and a non-toluene extractable crystalline copolymer content of from 55% to 65% by weight.

It will be noted that styrene-propylene copolymers containing lower amounts of copolymerized styrene are preferred for heat-shrinkable film applications. The reason is primarily the increase in haze and decrease in gloss occurring in higher copolymerized styrene content copolymers. These effects are illustrated in Table I following.

Table I

|  | A | B | C | D |
|---|---|---|---|---|
| Copolymerized styrene content (wt.-percent) | 0 | 8 | 15 | 35 |
| Shrinkage percent— |  |  |  |  |
| At 90° C.: |  |  |  |  |
| MD | 2 | 5 | 12 | 14 |
| TD | 3 | 10 | 32 | 28 |
| At 100° C.: |  |  |  |  |
| MD | 4 | 8 | 19 | 21 |
| TD | 8 | 17 | 41 | 40 |
| Haze, percent (ASTM D–1003–52) | 1 | 11 | 7 | 45 |
| Gloss (45° C.) | 79 | 50 | 60 | 26 |

In Table I, A is a propylene homopolymer mentioned for purposes of comparison, particularly to show the insufficiency of shrinkage obtained therewith; B is given to show a styrene-propylene copolymer containing only 8% copolymerized styrene and hence not falling within the range of copolymers suited for heat shrinkable film and the poor shrinkage characteristic thereof. Under C and D, data is presented contrasting copolymers having copolymerized styrene content within the preferred range with those having a maximal amount of copolymerized styrene. A considerable increase in percent haze in maximum (D) over the preferred (C) is indicated. A change of lesser magnitude, but a reduction in gloss occurred upon an increase in copolymerized styrene content from C to D. It will also be noted from Table I that percent shrinkage was greater at each temperature with increased copolymerized styrene content in the copolymer. The improvement in shrinkage characteristics, however, from 15% to 35% (C to D) copolymerized styrene content is small and usually outweighed by the lower haze and higher gloss of the equivalently shrinkable, preferred copolymerized styrene content copolymer.

The styrene-propylene films above-described can be biaxially oriented to give the heat shrinkable films of the present invention by any method known to the art for accomplishing the biaxial stretching or elongation of synthetic polymeric films. Among the suitable methods are those described in U.S. Patent 2,461,975 to Fuller and U.S. Patent 2,461,976 to Schenk comprising, generally, extrusion of the thermoplastic from a circular die orifice and simultaneous upward drawing and inflation of the resultant tube to impart biaxial orientation. Another method comprises flat extrusion and subsequent, or preferably simultaneous drawing over rollers to impart longitudinal orientation (MD) and lateral stretching to impart lateral orientation (TD). The copolymer film should be stretched at least 100% and up to 500% in both directions to provide heat shrinkability.

Table II following lists physical properties for a biaxially oriented film made from styrene-propylene copolymer having a copolymerized styrene content of 15% by weight. The film was oriented by mechanical drawing of an extruded flat sheet heated by means of infrared lamps.

The tensile impact strength given below was determined as follows. A number of strips of the film three inches long and one-half inch wide were stacked on one another to form a 15 mil high stack. These strips were fastened at one end in a clamp fixed to a bench. The other end was fixed in a clamp adapted to be struck by a hammer. Measured hammer blows were struck against the latter clamp and the data given in Table II below was calculated from the difference in the hammer path with no film sample and with a film sample.

Specular light transmission is a measure of the visible light (400–700 mm.) passing through a 3 mil thick film sample from a standard light source.

Cold cracking resistance was determined by bending film strips five inches long and one inch wide, and less than ten mils thick into loops, stapling them to cardboard and refrigerating them in a box until the sample was at the ambient temperature. The loop was then struck measured blows with a hammer. Failure of none of the samples at —70° C. is superior to most films and equivalent to polyethylene film. Plasticized vinyl film samples start to fail at temperatures as high as —30° C.

Table II

Description of film: E
Orientation percent TD to percent MD __ 400 x 400
Thickness, mils _____ 1.5

| Test | ASTM number | E |
|---|---|---|
| Tensile strength, p.s.i.: |  |  |
| MD | (D–882–54T) | 10,700 |
| TD | (D–882–54T) | 6,350 |
| Elongation, percent MD | (D–882–54T) | 115 |
| TD |  | 195 |
| Tensile impact (ft-lbs./in.³): |  |  |
| MD |  | 504 |
| TD |  | 456 |
| Permeability, cc./mil/100/in.²/24 hrs.: |  |  |
| $O_2$ | (D–1434–56T) | 266 |
| $CO_2$ | (D–1434–56T) | 600 |
| Shrinkage, percent MD: |  |  |
| 90° C |  | 31.2 |
| 100° C |  | 30.1 |
| Shrinkage, percent TD: |  |  |
| 90° C |  | 22.3 |
| 100° C |  | 26.2 |
| Specular light trans., percent: |  |  |
| 0° |  | 28 |
| 90° |  | 43 |
| Specular gloss per mil | (D–523–53T) | 119 |
| Haze, percent | (D–1003–52) | 10 |
| Cold crack, percent |  | *100 |

*Passed at —70° C.

The following examples are illustrative of the method and products of the present invention. All parts and percentages are by weight unless otherwise stated.

EXAMPLE 1

Twenty-five gallons of styrene/toluene solution containing 5% by volume of styrene were charged to a thirty-five gallon jacketed autoclave equipped with agitator, thermocouple well, sparger and reflux condenser. A catalyst mixture consisting essentially of 0.46 lb. of crystaline titanium trichloride and 0.59 lb. of triisobutyl aluminum was added. Propylene was sparged into the autoclave below the surface of the mixture at a rate sufficient to maintain 2 p.s.i. positive pressure within the autoclave. The reaction mixture was agitated with heat until a temperature of 60° C. was reached. The propylene addition was continued for 20 hours at a temperature of 60° C. Twenty and five-tenths pounds of reaction product were recovered by precipitation in isopropanol. Further purification was carried out by slurrying the product twice in isopropanol and filtering. The gross styrene-propylene copolymer was dried under reduced pressure at 78° C. The reaction rate was 1 lb. copolymer per pound of catalyst per hour. The gross copolymer contained 10% styrene by infrared analysis, had an ash content of 0.2%, a 1P melt index of 0.2 and a Rossi-Peakes flow at 160° and 1000 p.s.i. of 120 seconds.

EXAMPLE 2

Twenty-five gallons of styrene/toluene solution containing 10% by volume of styrene were charged to an autoclave as in Example 1. A catalyst mixture consisting essentially of 0.46 lb. crystalline titanium trichloride and 0.59 lb. triisobutyl aluminum was added. Propylene was sparged into the autoclave below the surface of the mixture at a rate sufficient to maintain 2 p.s.i. positive pressure therein. The reaction mixture was agitated with heat until a temperaure of 60° C. was achieved. The propylene addition was continued for 16 hours at a temperature of 60° C. Nineteen and seven-tenths pounds of reaction product were recovered. The reaction rate was 1.2 lbs. copolymer per pound catalyst per hour. The product contained 21% styrene by infra-red analysis, had an ash content of 0.07%, a 1P melt index of 0.25 and a Rossi-Peakes flow at 160° and 1000 p.s.i. of 130 seconds.

EXAMPLE 3

A solution containing 270 lbs. of styrene dissolved in 1,080 lbs. of toluene was charged to a 350 gallon jacketed autoclave fitted with agitator, thermocouple well, sparger and reflux condenser. A catalyst mixture consisting essentially of 3.3 lbs. crystalline titanium trichloride and 5.2 lbs. triisobutyl aluminum was added. Propylene was sparged into the autoclave at a rate sufficient to maintain a positive pressure of 2 p.s.i. therein. The reaction mixture was agitated with heat until a temperature of 60° C. was reached. The propylene addition was continued for 20 hours at 60° C. The gross copolymer product was precipitated by adding 1200 lbs. of butanol. Toluene and excess styrene were removed by azeotropic distillation with the butanol acting as a carrier. The slurry of reaction product in the remaining butanol was discharged to a centrifugal filter. After filtering, the product was washed with an additional 400 lbs. of butanol and dried at 70° C. under reduced pressure. Yield of gross copolymer was 216 lbs. of styrene-propylene copolymer which contained 35% styrene by infra-red analysis, had a 1P melt index of 0.2 and a Rossi-Peakes flow at 160° and 1000 p.s.i. of 150 seconds.

The gross copolymers obtained in Examples 1, 2 and 3 were each separated into their component copolymers of varying copolymerized styrene content by a successive extraction technique. For each gross copolymer, a 5.00 gram sample was placed in a thimble filter suspended below a reflux condenser attached to a 250 millimeter flask containing 100 milliliters of solvent. The vapors of boiling solvent passed around the thimble, were condensed in the condenser and then dripped back through the sample into the flask. The extraction in each instance was continued for 24 hours. The polymer was recovered from the solvent by precipitation with 100 milliliters of methanol. The precipitated polymer was filtered, washed with isopropanol and dried at a reduced pressure of 30 millimeters Hg at 70° C. for 12 hours. Analysis for styrene content was by infra-red methods. The solvent used for the first extraction was heptane; the heptane insoluble residue was extracted with cyclohexane; the heptane-cyclohexane insoluble residue was extracted with chloroform; the heptane-cyclohexane-chloroform insoluble residue was extracted with toluene.

The nature of the copolymers of this invention as mixtures of styrene-propylene copolymers of varying styrene and propylene content, rather than simple copolymers, is illustrated by Table III following. The percentages of each fraction obtained in the above-described extractions are given. The fractions obtained are indicated by the letters F, G, H and I and are defined thus:

| Copoly-mer | Reduced viscosity toluene | Wt. percent styrene | Solubility | | | |
|---|---|---|---|---|---|---|
| | | | Heptane | Cyclohexane | Chloroform | Toluene |
| F | 2.0–2.5 | 20–45 | Sol | Sol | Sol | Sol. |
| G | 3.0–3.5 | 50–70 | Insol | Sol | Sol | Sol. |
| H | 3.5–4.0 | 60–80 | Insol | Insol | Sol | Sol. |
| I | | 5–10 | Insol | Insol | Insol | Insol. |

*Table III*

| Weight percent styrene in gross copolymer | Weight percent | | | |
|---|---|---|---|---|
| | Soluble copolymer | | | Insoluble copolymer |
| | F | G | H | I |
| Example 1 | 10 | 33 | 3 | | 65 |
| Example 2 | 21 | 26 | 9 | 9 | 53 |
| Example 3 | 35 | 24 | 14 | 21 | 41 |

The gross copolymers prepared in Examples 1, 2 and 3 were tested for mechanical properties. Bars were injection molded from each of the products at a cylinder temperature of 430° F. and a mold temperature of 100° F. The following results were obtained:

*Table IV*

| Example | Styrene | Tensile str., p.s.i. | Tensile mod., p.s.i. | Elong. at break, percent | Izod impact, ft.-lb./in. notch | Rockwell hardness |
|---|---|---|---|---|---|---|
| 1 | 10 | 3,400 | 64,000 | 130 | 11 | R12. |
| 2 | 21 | 3,790 | 59,000 | 155 | 13 | R5. |
| 3 | 35 | 3,470 | 83,000 | 120 | 2.5 | R9. |

The electrical properties of the styrene-propylene gross copolymers of this invention are at least equivalent and even slightly superior to either polyethylene or polyvinyl chloride. This feature, combined with ease of extrusion as a coating and abrasion resistance, makes these copolymers advantageous in wire coating or insulation applications. Electrical properties are summarized in Table V.

*Table V*

| | Percent styrene | Power factor ×10⁴ | | Percent styrene | Dielectric, 60 cycles | Constant, 1 kc. | Dielectric strength, volts/mil |
|---|---|---|---|---|---|---|---|
| | | At 60 cycles | At 1 kc. | | | | |
| Ex. 2 | 21 | 6 | 9 | 21 | 2.31 | 2.31 | 670 |
| Ex. 3 | 35 | 7 | 9 | 35 | 2.36 | 2.36 | 670 |
| Polyethylene | | 5 | 5 | | 2.3 | 2.3 | 500 |
| Polyvinyl chloride | | 50 | | | 3.2 | | 400–800 |

To illustrate preparation of styrene-propylene copolymers by prior art methods, the following experiment is presented.

A 3000 ml. reaction flask was charged with 1500 milliliters of a 5% by volume solution of styrene in toluene, 60 millimoles of triisobutyl aluminum and 20 millimoles of titanium tetrachloride. A stream of propylene was introduced below the surface of the stirred reaction mixture at a rate slightly in excess of the rate of absorption. The reaction mixture was heated to 65° C. and maintained at this temperature for two hours. After hydrolyzing the reaction mixture with excess methanol, the copolymer was collected by filtering and washed several times with fresh methanol. There were obtained 8.8 grams of copolymer which were analyzed by infrared techniques and found to contain 18% styrene and 82% propylene by weight.

A 0.1 gram sample of this material was dissolved rapidly in 20 ml. of refluxing toluene. The absence of any visible copolymer indicated at least 90% dissolution in the toluene.

The soluble non-crystalline non-isotactic nature of the copolymer is evident. The striking advantage of the copolymers of this invention over those of the prior art is an unexpected result occurring only with the use of a TiCl₃ containing catalyst.

EXAMPLE 4

A four fraction styrene-propylene gross copolymer containing 15% by weight copolymerized styrene and 85% by weight copolymerized propylene was prepared by the method of the previous examples. The copolymer was extruded from a die slit in a flat sheet 15 mils thick. Extruder temperatures were 350° C. at the rear and 380° C. at the front of the barrel. The die temperature was 400° C.

After cooling to approximately 120° C., the 15 mil film was oriented 300% in machine direction (MD) and 300% in transverse direction (TD) on a tentering frame, i.e., increased fourfold in length and width. Orientation was carried out as follows: The extruded flat sheet was borne on a series of successively faster moving rollers which gripped the sheet and stretched it progressively farther in the machine direction. Simultaneously, the sheet was gripped at either edge and stretched in the transverse direction as the gripping means diverged. The resulting film was 1.5 mils in thickness. Strips were cut from the film to determine shrinkage properties. Strips cut in both the machine direction and the transverse direction were found to shrink from 25% to 35% on immersion for 10 seconds in water heated to 90–100° C.

Additional film from the above extrusion and orientation was made into bags by heat sealing. Fresh poultry were placed in the bags and a vacuum drawn on each of the bags to draw the wrinkled film against the poultry. The film-wrapped poultry were immersed in a bath of water heated to 90–100° C. for a period of 10 seconds. Upon withdrawal, the film bags now smoothed skin-tight against the poultry, were twisted and folded double at the top and fastened with a rubber band and placed on a quick freeze unit maintained at −22° C. After 48 hours, the packages were removed and inspected. The films were found to be in close fitting contact about the poultry and had high gloss and good clarity.

To test the low temperature strength of the heat-shrinkable copolymer films of the invention under conditions simulating the worst possible handling, each package, still frozen, was placed in a large cardboard box. The cardboard box was put into a close-fitting wooden box and thus effectively insulated. The box was then tumbled about to give a number of two or three foot drops to the package. The film was inspected after the tests for cracks and abrasion damage. The copolymer films of this invention remained uncracked and undamaged by as many as seventy-two drops. Conventional vinyl chloride-vinylidene chloride copolymer film cracked after only 36 drops. Films of this invention were twice as durable. Also, the cracks finally developing in the copolymer film of this invention did not increase in size. With the above vinyl film, however, the cracks that developed over the leg bones were self-propagating and shortly the wrapper was useless as a protective envelope.

What is claimed is:

1. A film forming thermoplastic composition having a melt index of from 0.1 to 2.0 and comprising a gross copolymer comprising a mixture of styrene-propylene copolymers containing from 10–35% by weight styrene copolymerized with propylene, said gross copolymer being a mixture of no less than 40% by weight of a copolymer fraction having a styrene content of from 5 to 10% by weight and insoluble in toluene, heptane, cyclohexane and chloroform, a copolymer fraction having a styrene content of from 20 to 45% by weight and soluble in toluene, heptane, cyclohexane and chloroform, a copolymer fraction having a styrene content of from 50 to 75% by weight and soluble in toluene, cyclohexane and chloroform and a coplymer fraction having a styrene content of from 60 to 80% by weight and soluble in toluene and chloroform.

2. A film forming thermoplastic composition having a melt index of from 0.1 to 2.0 and comprising a gross copolymer comprising a mixture of styrene-propylene copolymers containing from 10 to 35% by weight styrene copolymerized with propylene, said gross copolymer being a mixture of from 40 to 65% by weight of a copolymer fraction having a styrene content ranging from 5 to 10% by weight and insoluble in toluene, heptane, cyclohexane and chloroform, and from 35 to 60% by weight of a copolymer fraction having a styrene content of from 20 to 45% by weight and soluble in toluene, heptane, cyclohexane and chloroform, a copolymer fraction having a styrene content of from 50 to 75% by weight and soluble in toluene, cyclohexane and chloroform and a copolymer fraction having a styrene content of from 60 to 80% by weight and soluble in toluene and chloroform.

3. A gross copolymer comprising a mixture of styrene-propylene copolymers containing from 10 to 20% by weight styrene copolymerized with propylene, said gross copolymer being a mixture of from 55 to 65% by weight of a copolymer fraction having a styrene content ranging from 5 to 10% by weight and insoluble in toluene, heptane, cyclohexane and chloroform, and from 45 to 35% by weight of a copolymer fraction having a styrene content of from 20 to 45% by weight and soluble in toluene, heptane, cyclohexane and chloroform, a copolymer fraction having a styrene content of from 50 to 75% by weight and soluble in toluene, cyclohexane and chloroform and a copolymer fraction having a styrene content of from 60 to 80% by weight and soluble in toluene and chloroform.

4. A heat-shrinkable film comprising the gross copolymer of claim 1, said film having been biaxially stretched and oriented at least 100%.

5. A heat-shrinkable film comprising the gross copolymer of claim 2, said film having been biaxially stretched and oriented at least 100%.

6. A heat-shrinkable film comprising the gross copolymer of claim 3, said film having been biaxially stretched and oriented at least 100%.

References Cited by the Examiner

UNITED STATES PATENTS

| | | | |
|---|---|---|---|
| 2,977,347 | 3/1961 | Minckler et al. | 260—88.2 |
| 2,977,350 | 3/1961 | Fasce et al. | 260—88.2 |
| 2,980,660 | 4/1961 | Ralls | 260—88.2 |
| 2,994,691 | 8/1961 | Gates | 260—88.2 |

FOREIGN PATENTS 538,782  12/1955  Belgium.

MURRAY TILLMAN, *Primary Examiner.*

D. ARNOLD, LEON J. BERCOVITZ, *Examiners.*